(12) United States Patent
Choi et al.

(10) Patent No.: US 12,482,209 B2
(45) Date of Patent: Nov. 25, 2025

(54) METHOD AND APPARATUS FOR GENERATING VIRTUAL CONCERT ENVIRONMENT IN METAVERSE

(71) Applicant: ELECTRONICS AND TELECOMMUNICATIONS RESEARCH INSTITUTE, Daejeon (KR)

(72) Inventors: Jin-Sung Choi, Daejeon (KR); Ki-Hong Kim, Daejeon (KR); Yong-Wan Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 224 days.

(21) Appl. No.: 18/327,604

(22) Filed: Jun. 1, 2023

(65) Prior Publication Data

US 2024/0161432 A1 May 16, 2024

(30) Foreign Application Priority Data

Nov. 10, 2022 (KR) .................. 10-2022-0149198

(51) Int. Cl.
| | |
|---|---|
| G06T 19/00 | (2011.01) |
| G06T 7/70 | (2017.01) |
| G06T 19/20 | (2011.01) |
| G06V 10/44 | (2022.01) |
| G06V 10/771 | (2022.01) |

(52) U.S. Cl.
CPC ............... *G06T 19/20* (2013.01); *G06T 7/70* (2017.01); *G06V 10/44* (2022.01); *G06V 10/771* (2022.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 8,890,879 | B1 * | 11/2014 | Garrity ................ | G06T 15/005 345/553 |
| 10,956,817 | B2 * | 3/2021 | Oliveira Pinheiro .. | G06N 3/045 |
| 11,321,937 | B1 * | 5/2022 | Jiang .................... | G06V 20/647 |
| 2006/0282461 | A1 * | 12/2006 | Marinescu ............. | G06F 9/52 |
| 2007/0198695 | A1 * | 8/2007 | Engelmann .......... | G06Q 10/087 709/224 |

(Continued)

FOREIGN PATENT DOCUMENTS

| KR | 10-2014-0103468 | 8/2014 |
|---|---|---|
| KR | 10-2019-0110218 | 9/2019 |

(Continued)

*Primary Examiner* — Martin Mushambo
(74) *Attorney, Agent, or Firm* — KILE PARK REED & HOUTTEMAN PLLC

(57) ABSTRACT

Disclosed herein is a method for generating a virtual concert environment in a metaverse. The method may include collecting data related to a virtual concert, generating a multi-feature layer map for reflecting features of respective elements constituting a virtual concert environment based on the data and generating a virtual concert environment based on the multi-feature layer map, and aligning and matching an object in the virtual concert environment based on virtual space coordinates of a metaverse space.

20 Claims, 5 Drawing Sheets

(56) References Cited

U.S. PATENT DOCUMENTS

| | | | |
|---|---|---|---|
| 2008/0310707 A1* | 12/2008 | Kansal | G06T 19/006 382/154 |
| 2015/0036920 A1* | 2/2015 | Wu | G06V 10/764 382/156 |
| 2015/0062123 A1* | 3/2015 | Yuen | G06T 19/006 345/420 |
| 2016/0012643 A1* | 1/2016 | Kezele | H04N 13/344 345/633 |
| 2017/0200313 A1* | 7/2017 | Lee | H04N 9/3194 |
| 2018/0033160 A1* | 2/2018 | Ishigami | G01C 15/00 |
| 2018/0077400 A1* | 3/2018 | Ayari | G06V 10/82 |
| 2018/0211427 A1* | 7/2018 | Andrew | G06T 11/00 |
| 2018/0253869 A1* | 9/2018 | Yumer | G06T 11/60 |
| 2019/0066265 A1* | 2/2019 | Lin | G06N 3/045 |
| 2019/0295261 A1* | 9/2019 | Kang | G06V 10/764 |
| 2020/0082567 A1* | 3/2020 | Liu | G06T 7/248 |
| 2020/0160144 A1* | 5/2020 | Gutfreund | G06N 3/082 |
| 2020/0250470 A1* | 8/2020 | Kim | H04W 4/46 |
| 2020/0272898 A1* | 8/2020 | Park | G06N 3/045 |
| 2020/0273237 A1* | 8/2020 | Sunkavalli | G06N 20/00 |
| 2020/0334555 A1* | 10/2020 | Liu | G06N 5/046 |
| 2021/0027152 A1* | 1/2021 | Van Der Made | G06N 3/063 |
| 2021/0089841 A1* | 3/2021 | Mithun | G06T 7/90 |
| 2021/0102781 A1* | 4/2021 | Lee | F41G 3/2694 |
| 2021/0134039 A1* | 5/2021 | Tan | G06F 3/0304 |
| 2021/0142567 A1* | 5/2021 | Seneger | G06T 7/70 |
| 2021/0248376 A1* | 8/2021 | Zhao | G06V 20/49 |
| 2021/0287350 A1* | 9/2021 | Li | G06V 10/462 |
| 2021/0334662 A1* | 10/2021 | Kim | G06N 3/082 |
| 2021/0404814 A1* | 12/2021 | Hess | G01C 21/32 |
| 2022/0157022 A1* | 5/2022 | Baek | G06T 19/003 |
| 2022/0180622 A1* | 6/2022 | Zhang | G06T 7/194 |
| 2022/0256647 A1* | 8/2022 | Salmasi | H04L 67/12 |
| 2022/0383037 A1* | 12/2022 | Pham | G06F 18/25 |
| 2023/0252814 A1* | 8/2023 | Kim | G06V 10/40 382/103 |
| 2023/0260185 A1* | 8/2023 | Kim | G06T 7/194 |
| 2023/0394758 A1* | 12/2023 | Fu | G06T 17/00 |
| 2024/0135509 A1* | 4/2024 | Liu | G06T 5/77 |
| 2024/0135511 A1* | 4/2024 | Singh | G06V 10/44 |
| 2024/0135514 A1* | 4/2024 | Pakhomov | G06T 5/60 |

FOREIGN PATENT DOCUMENTS

| | | | |
|---|---|---|---|
| KR | 10-2020-0001871 | | 1/2020 |
| KR | 10-2021-0125365 | | 10/2021 |
| KR | 10-2342738 | | 12/2021 |
| KR | 10-2376390 | | 3/2022 |
| KR | 10-2420379 | * | 7/2022 |

* cited by examiner

S1: DEFINE 6DoF OF OBJECT IN CATEGORY
S2: DEFINE CORRELATION BETWEEN CATEGORIES
S3: DEFINE CORRELATION BETWEEN
    OBJECTS IN CATEGORY

EXAMPLE;
$$\begin{Bmatrix} [P1] = \text{INSTANCE}(C1:1), S11+S12+S13 \\ = \text{INSRANCE}(C1:2), S21+S22+S23 \\ \ldots \\ \text{INSRANCE}(C1:n), \ldots \end{Bmatrix}$$

METHOD AND APPARATUS FOR GENERATING VIRTUAL CONCERT ENVIRONMENT IN METAVERSE

CROSS REFERENCE TO RELATED APPLICATION

This application claims the benefit of Korean Patent Application No. 10-2022-0149198, filed Nov. 10, 2022, which is hereby incorporated by reference in its entirety into this application.

BACKGROUND OF THE INVENTION

1. Technical Field

The present disclosure relates to a method and apparatus capable of quickly generating various virtual concert environments required for performing a concert in a metaverse.

2. Description of the Related Art

Generally, a virtual space is produced by modeling and appropriately arranging a space and interior members/props using commercial tools, such as Maya, 3ds Max, and the like. Recently, there was a case in which a cinematic (hyper-realistic) virtual space was created in perfect 3D thanks to a real-time high-quality game engine ('The Matrix Reloaded' achieving a photorealistic level using the Unreal Engine 5). When content, such as movies, animations, and the like, is produced using the Unreal Engine, a virtual space is generally created by creating all resources required for forming the virtual space, selecting/loading/arranging objects required for forming the space using a content browser, triggering an event using a time sequence function, visualizing effects and the like according to the event, and matching and synthesizing the effects in a given scene in real time.

As a method of creating a virtual space (a game world, or the like), a citywide virtual space may be created in a tool based on procedural rules based on characteristics such as the sizes of roads, the heights of buildings, and the like these days. Also, not a procedural approach using an existing authoring technique, such as modeling, space layout, and the like, but a method of referring to a certain rule applicable to arrangement of objects (elements) forming a space at the data creation step or the data authoring step has been proposed for creation of a virtual space.

Particularly, it is likely that this method significantly reduces the time when relatively similar or homogeneous virtual spaces or objects are arranged and synthesized. This method is suitable in fields in which space organization is performed by representing a virtual world just like a scenario as in games or movies, but it is difficult to apply this method to applications in a field in which a virtual environment has to be frequently changed for a relatively short period of time depending on a music style, an atmosphere, or a theme, as in a virtual concert.

SUMMARY OF THE INVENTION

An object of the present disclosure is to provide a method and apparatus for generating a virtual concert environment in the metaverse that are capable of more quickly producing a virtual concert environment than an existing method and immediately changing the virtual concert environment when necessary.

In order to accomplish the above object, a method for generating a virtual concert environment in a metaverse according to an embodiment may include collecting data related to a virtual concert, generating a multi-feature layer map for reflecting features of respective elements constituting a virtual concert environment based on the data and generating the virtual concert environment based on the multi-feature layer map, and aligning and matching an object in the virtual concert environment based on virtual space coordinates of a metaverse space.

Collecting the data related to the virtual concert may include performing category processing by receiving the data as input of a deep-learning model and transforming an object in a category to a parametric domain through a transform layer.

Performing the category processing may include defining 6 degrees of freedom (6DoF) of the object in the category.

Performing the category processing may further include defining the correlation between categories.

Performing the category processing may further include defining the correlation between objects in the category.

The multi-feature layer map may be generated by gradually building a layer map based on similar features in a category domain generated based on the data and in a parametric domain into which an object domain in a category is transformed.

The multi-feature layer map may be configured to provide a user interface (UI) for representing the elements constituting the virtual concert environment as a 2D feature map.

A result of the multi-feature layer map may be reviewed in a 3D space.

Aligning and matching the object may comprise automatically adjusting a pose value of the object when the object deviates from a ground baseline or when the object is in a wrong position.

At least one of operations including union, separator, or scale, or a combination thereof may be performed based on the relationship between objects in the virtual concert environment and metadata on the objects.

Also, in order to accomplish the above object, an apparatus for generating a virtual concert environment in a metaverse according to an embodiment includes memory in which a control program for generating a virtual concert environment in a metaverse is stored and a processor for executing the control program stored in the memory. The processor may collect data related to a virtual concert, generate a multi-feature layer map for reflecting features of respective elements constituting a virtual concert environment based on the data, generate a virtual concert environment based on the multi-feature layer map, and align and match an object in the virtual concert environment based on virtual space coordinates of a metaverse space.

The processor may perform category processing by receiving data as input of a deep-learning model and transform an object in a category to a parametric domain through a transform layer.

The processor may define 6DoF of the object in the category.

The processor may define the correlation between categories.

The processor may define the correlation between objects in the category.

The multi-feature layer map may be generated by gradually building a layer map based on similar features in a category domain generated based on the data and in a parametric domain into which an object domain in a category is transformed.

The multi-feature layer map may be configured to provide a UI for representing the elements constituting the virtual concert environment as a 2D feature map.

A result of the multi-feature layer map may be reviewed in a 3D space.

The processor may automatically adjust a pose value of the object when the object deviates from a ground baseline or when the object is in a wrong position.

The processor may perform at least one of operations including union, separator, or scale, or a combination thereof based on the relationship between objects in the virtual concert environment and metadata on the objects.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
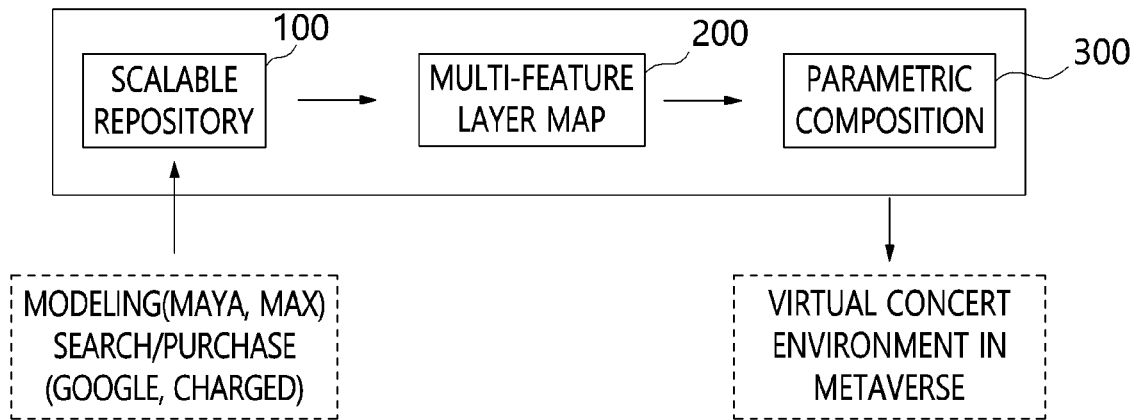
FIG. 1 is a block diagram illustrating an apparatus for generating a virtual concert environment in a metaverse according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a block diagram illustrating an apparatus for generating a virtual concert environment in a metaverse according to an embodiment.

Referring to FIG. 1, the apparatus for generating a virtual concert environment in a metaverse according to an embodiment may include a scalable repository generation unit 100, a multi-feature layer map generation unit 200, and a parametric composition unit 300.

The scalable repository generation unit 100 may receive external data. The external data may be virtual-concert-related data generated in external commercial tools, such as Maya, 3ds Max, and the like. The external data may be data collected from Google or online asset stores.

The multi-feature layer map generation unit 200 may generate a multi-feature layer map that reflects the features of each element (or group) constituting a virtual concert environment. The multi-feature layer map generation unit 200 may generate a virtual concert environment using the multi-feature layer map.

The parametric composition unit 300 may align and match constituent entities such that respective elements, such as objects in the virtual concert environment, match the reference coordinate system of a target metaverse space through refinement.

Figure 2:
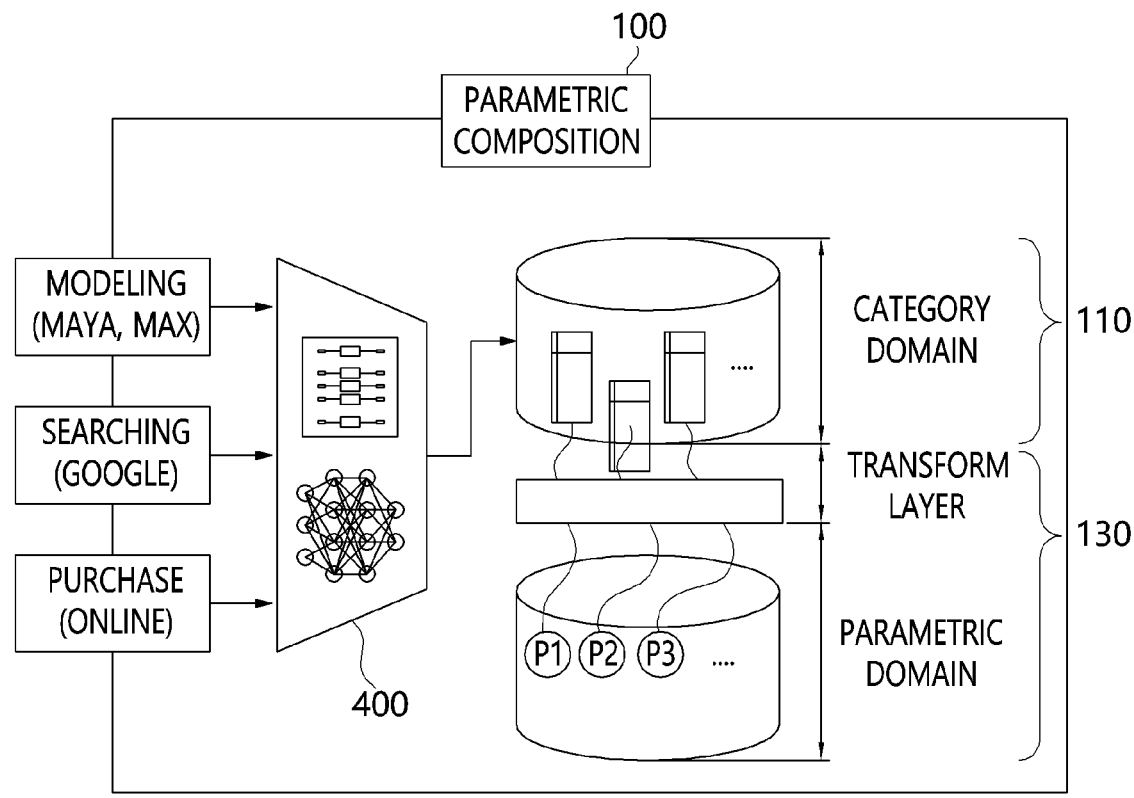
FIG. 2 is a block diagram illustrating the configuration of a scalable repository according to an embodiment.

FIG. 2 is a block diagram illustrating the configuration of a scalable repository generation unit according to an embodiment.

As illustrated in FIG. 2, when data is input, the scalable repository generation unit 100 may perform category processing in advance using a deep-learning technique. The scalable repository generation unit 100 may use a deep-learning model 400 that performs classification according to preset categories using images of given model data. The scalable repository generation unit 100 may improve the effectiveness of an existing deep-learning data technique when it is limited to a category related to a virtual concert environment, the details thereof, and representative characteristics. The category may be limited to key domains of respective components required for generating a virtual concert environment.

The scalable repository generation unit 100 may perform processes for a category domain 110, a transform layer and a parametric domain 130.

Figure 3:
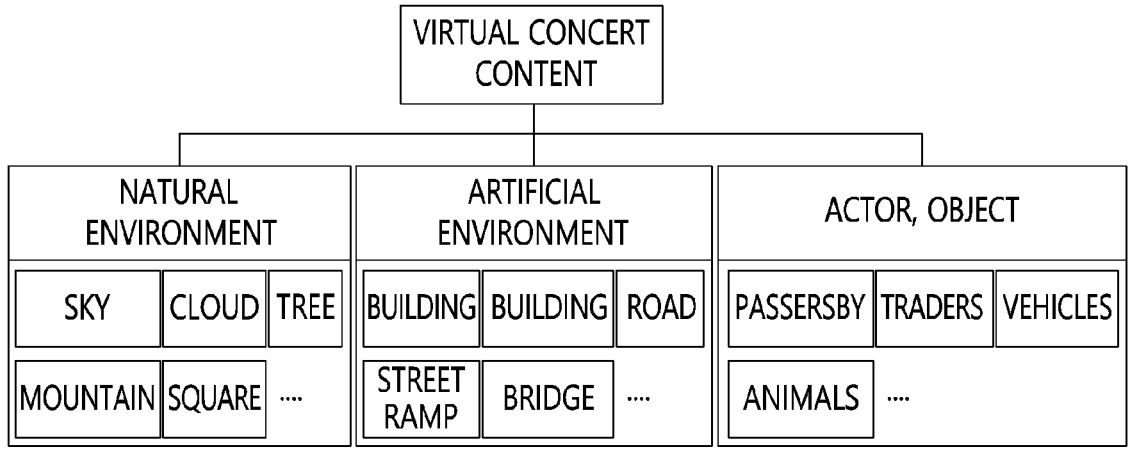
FIG. 3 is a view illustrating a process of hierarchical structuring of a category domain according to an embodiment.

FIG. 3 is a view illustrating a process of hierarchical structuring of a category domain according to an embodiment.

As illustrated in FIG. 3, a virtual concert environment may be separated into a natural environment category, including the sky, clouds, and the like, and an artificial environment category, including buildings, and the like. Here, the natural environment category may be subdivided into subcategories, such as the sky, clouds, trees, and the like. In the same manner, the artificial environment category may be subdivided into buildings, roads, and the like. In addition to these environment categories, various objects constituting the virtual concert environment may be grouped as an independent category.

For example, in order to represent the virtual concert environment as a vibrant space after generation thereof, passersby walking in the street, traders staying in a nearby specific region, vehicles moving on the road, animals, and the like should have autonomy or should be defined using a specific behavior pattern, and these entities may be included in the above-mentioned independent category.

For example, passersby should be depicted as autonomously walking, in which case the number of passersby may be automatically controlled by varying the degree of a behavior pattern, such as the density. The present disclosure intends to limit the scope to a target and scope highly related to a virtual concert environment, and when the types of virtual concert environments are expanded, scalability may be achieved through multi-level structuring by expanding a given category to include categories of a subordinate concept.

Figure 4:
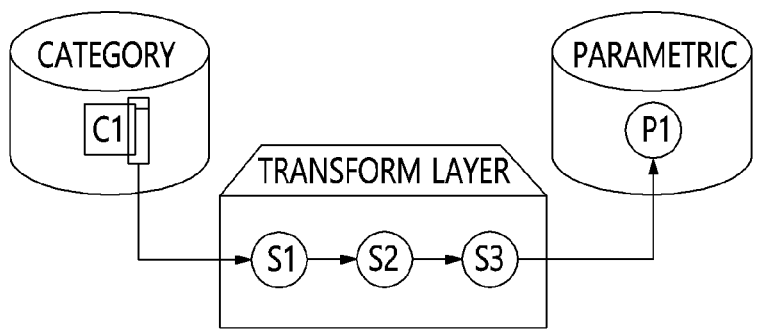
FIG. 4 is a view illustrating a transform layer and a parametric domain process according to an embodiment.

FIG. 4 is a view illustrating a transform layer and a parametric domain process according to an embodiment.

As illustrated in FIG. 4, it may be necessary to transform an object in a category to a parametric domain in advance in order to perform functions in the multi-feature layer map generation unit and the parametric composition unit. Accordingly, the object in the category may be transformed to the parametric domain through a transform layer. For example, category C1 is transformed into P1 via the transform layer, and P1 may be finally stored as data, including information about C1 and parameter data defined in S1 to S3.

In the transform layer, 6 degrees of freedom (6DoF) of a constituent object in the same category are defined. Specifically, when the object is loaded into a virtual space, where the object is to be placed relative to a global coordinate system and the posture thereof are defined. For example, if a tree in the natural environment is C1, when C1 is loaded into a processor (using a commercial/public 3D viewer/editor) and 6DoF thereof are redefined and stored in the process of S1 so as to be readily arranged in the virtual space, C1 may be easily processed when it is arranged in an arbitrary application target or environment.

In S2, C1 (tree) may be disposed on the edge of a road, which is included in the artificial environment category. Here, when metadata, such as a specific range of the highest level of a building, and the like, is tagged, the processors of the multi-feature layer map generation unit and parametric composition unit may interpret the metadata and thereby perform relatively automated processing when a virtual environment is formed. Unlike S2 for defining the correlation between categories, S3 may define, when a specific object in a category is inserted into a virtual space, the correlation therebetween. For example, C1 (tree) is tagged with metadata in which trees are arranged based on the ground of a space against the sky and clouds, so that the metadata is referred to when processing is performed in the multi-feature layer map generation unit and the parametric composition unit.

Through the above-described method, each piece of data in the category domain is transformed to a parametric domain by performing the processing process of S1 to S3 using an existing tool, and additional information (metadata) may be generated in this process. That is, P1 corresponding to C1 is required to make it possible to identify and designate a specific object in the corresponding category domain (e.g., a unique ID in a given database, or in the form of an index/link), and metadata generated through S1 to S3 has to be stored along therewith. Consequently, the result of applying the transform layer to the object included in the category domain may be stored in the parametric domain.

Figure 5:
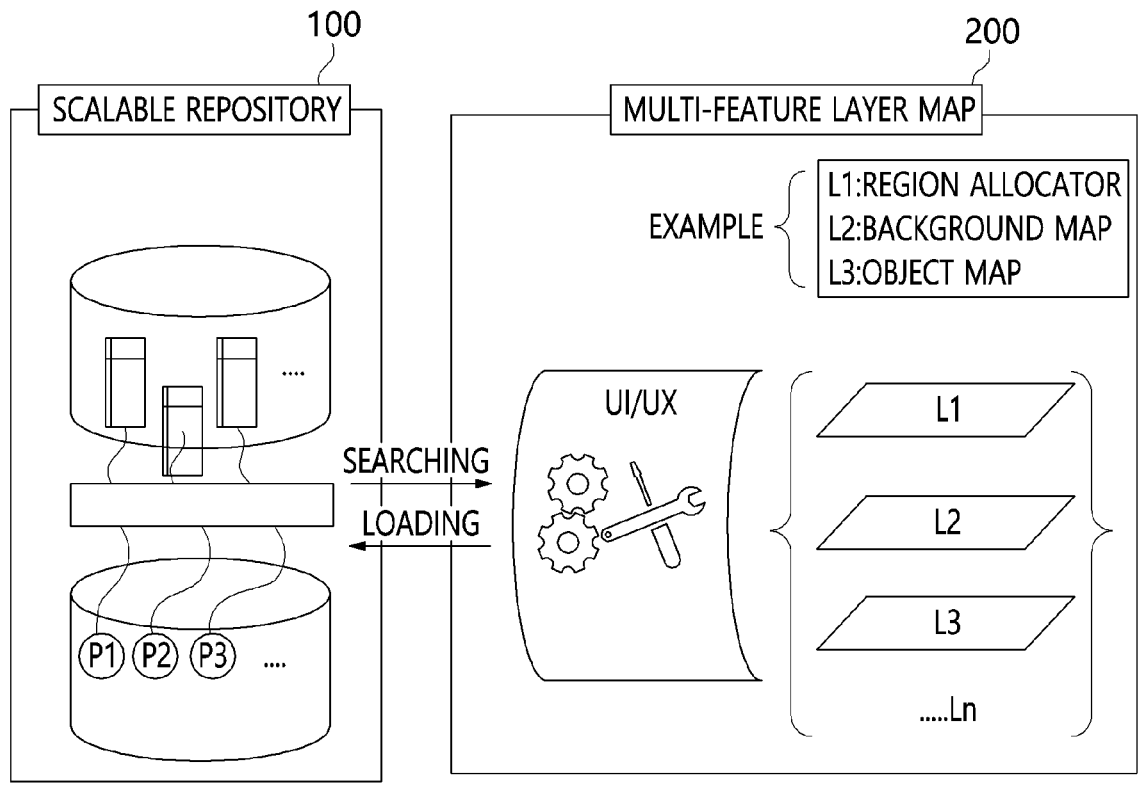
FIG. 5 is a block diagram illustrating the configuration of a multi-feature layer map according to an embodiment.

FIG. 5 is a block diagram illustrating the configuration of a multi-feature layer map generation unit according to an embodiment.

As illustrated in FIG. 5, the multi-feature layer map generation unit 200 views the features of elements constituting a virtual concert environment as a layer and processes the same using arithmetic operations, whereby the virtual concert environment may be finally generated.

This may be a method of gradually generating the entire space by manipulating and controlling a layer map capable of being reflected in a virtual space based on features in a single category having homogeneity in a virtual concert environment. A layer map based on other features is visualized, manipulated, and controlled in the same manner, whereby the whole virtual concert environment may be generated.

To this end, it is necessary to define and analyze/extract the features of a virtual concert space and objects, to visualize similar/homogeneous features as a map in each layer using the features so as to be easily handled by a user, and to provide an intuitive user interface (UI)/user experience (UX) to the user.

For example, L1 to Ln may correspond to a method of gradually constructing a virtual concert environment using a layer map based on similar features or the same feature in the category domain and the parametric domain generated in the scalable repository generation unit 100.

For example, L1 is a layer map for directly mapping natural objects such as the sky/clouds to an area, L2 is a layer map for roughly setting terrain features in the space such that houses, buildings, and the like can be disposed in the area surrounding a virtual stage, and there may be an object allocator layer map for retrieving/loading objects in the category, such as houses, buildings, and the like, and arranging the same along the contour of the terrain.

Finally, a processing process for including or fusing the results of the respective layers is performed, whereby a virtual concert environment may be generated. When the types and scope of a virtual concert environment are expanded, L1 to Ln may be increased in proportion thereto.

Figure 6:
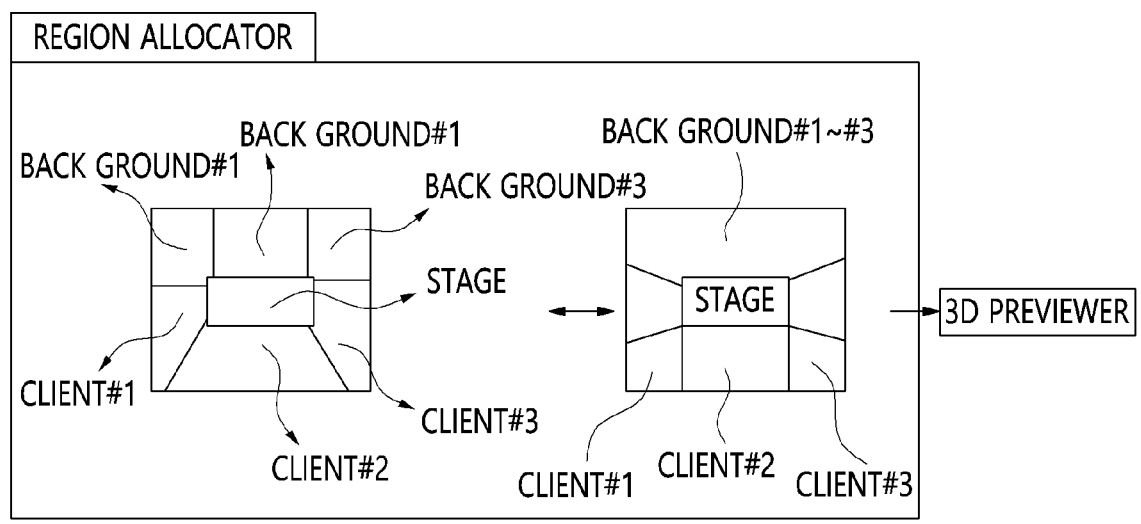
FIG. 6 is a block diagram illustrating the detailed configuration of a multi-feature layer map according to an embodiment.

FIG. 6 is a block diagram illustrating the detailed configuration of a multi-feature layer map generation unit according to an embodiment.

As illustrated in FIG. 6, because a virtual concert environment is a 3D space, it is necessary to lower dimensionality and thereby reduce a cognitive load for the convenience of users. The given 3D space is represented as a floor plan, an elevation, and the like by viewing the same space from multiple points of view, whereby quick understanding may be provided.

For example, when the entire virtual concert environment is regarded as a layer for allocating a region for representing the same object, a map capable of reflecting 2D characteristics, as in the example of FIG. 6, and design of an intuitive UI, through which main regions of the virtual concert environment can be represented in the given planar space, may be incorporated in L1 of FIG. 5. However, it should be possible to review the final result through a 3D preview. That is, a UI for representing the basic elements of a virtual concert environment, such as a background, a stage, and audience, as a 2D feature map is provided, and the final result may be reviewed in a 3D space using a 3D previewer.

Specifically, different main regions may be set in the floor plan and the elevation of the virtual concert environment. When the multi-feature layer map generation unit is used for each of the regions, a 3D space and environment may be generated. For example, when it is intended to generate a Greek-themed virtual concert environment and concert stage, visualization processing through which a background area (Back Ground #1) of a virtual stage is automatically filled with a sky and clouds through brushing using a UI/UX, such as a brush icon or the like, in a layer map having the characteristics of natural things, such as a sky background and clouds, may be performed.

In the area under the sky and clouds, the environment surrounding the virtual stage may be abundantly filled in a relatively easy and intuitive manner by performing a function of arranging houses having various shapes and colors in the corresponding region (Back Ground #1, #3) using a UI, such as brushes and the like, with reference to the outline of a mountain shape in Santorini. However, this process requires quickly retrieving and loading various houses painted in blue and white in a house category from the repository of the scalable repository generation unit 100. That is, it is necessary to retrieve and load target data matching with each of the set regions from the repository, and to this end, processing of the category domain and the parametric domain matching the same has to be periodically performed in advance for all data in the large-capacity DB.

Finally, the multi-feature layer map generation unit may consider a single virtual concert environment a uniform category, visualize the same as a layer map, and author the same through simple UI/UX behavior for brushing the layer map represented as a plane with data of the corresponding category, which is fetched from the scalable repository generation unit using representative features, and the virtual concert environment may be automatically previewed as a 3D virtual concert environment.

In order to perform this convenient function in a superordinate concept, multi-level structuring for suitably classifying all elements present in a single virtual concert environment based on objects may be performed, and respective objects (content/data) defined as nodes and metadata on the relationship therebetween may be stored in a graph format and may be managed through consistent update when they are changed.

Figure 7:
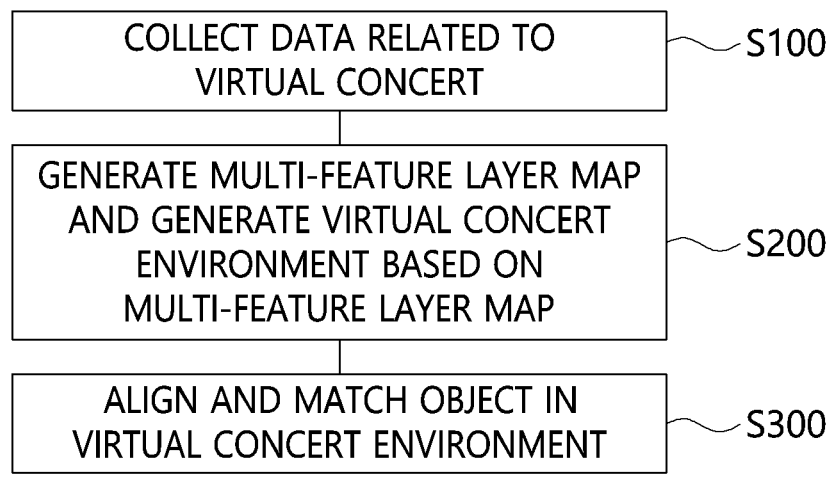
FIG. 7 is a flowchart illustrating a method for generating a virtual concert environment in a metaverse according to an embodiment.

FIG. 7 is a flowchart illustrating a method for generating a virtual concert environment in a metaverse according to an embodiment.

The method for generating a virtual concert environment in a metaverse according to an embodiment may be performed by an apparatus for generating a virtual concert environment in a metaverse according to an embodiment.

The method for generating a virtual concert environment in a metaverse according to an embodiment is described for the case in which it is intended to generate a virtual concert environment in a Greek-themed background and environment.

As illustrated in FIG. 7, the method for generating a virtual concert environment in a metaverse according to an embodiment may include collecting data related to a virtual concert at step S100, generating a multi-feature layer map for reflecting the features of respective components constituting a virtual concert environment based on the data and generating the virtual concert environment based on the multi-feature layer map at step S200, and aligning and matching the objects in the virtual concert environment based on virtual space coordinates of a metaverse space at step S300.

The apparatus for generating a virtual concert environment in a metaverse may perform a quick search using a category. For example, objects may be retrieved from a natural environment category in consideration of the characteristics of the sky and clouds in Greece, and to this end, it is necessary to add metadata on each object in the category in advance. Also, objects in the shape of one-story houses may be retrieved from a house/building category, and blue and white objects may be selected therefrom and then be loaded. In a parametric domain connected with each of these objects (the house, the sky, and the like), a process of defining metadata that has to be referred to when the object is disposed in the space may be performed. The metadata may be referred to when the objects are aligned and matched all together.

When it generates a Greek-themed virtual concert environment, the apparatus for generating a virtual concert environment in a metaverse performs successive processing on a few levels of layer maps. For example, an interface through which a region of the space to be generated can be set is provided in L1, and when an object, such as the sky, clouds, or the like, in the natural environment category is intuitively mapped to a layer map using a provided UI, it is automatically disposed in an actual 3D space, whereby the entire space may be generated.

Also, this method is associated with a method of generating an object by referring to the relationship between categories, the relationship between objects in the category, and the characteristics of objects in the category. For example, after an area in which a road is to be placed is set, a road is placed in the area, and when suitable trees are selected from a tree category and arranged, the trees may be automatically set to be placed at set intervals along the road with reference to the metadata. However, it is necessary to make metadata contain such a relationship in a logical manner when a scalable repository is generated.

When various objects are roughly arranged in the virtual concert environment, the apparatus for generating a virtual concert environment in a metaverse aligns/matches the objects in a reference 3D space by referring to a virtual space coordinate system and the relationship of the arranged objects, thereby completing the refined virtual concert environment. This may mean that spatial matching/alignment of all of the elements constituting the virtual concert environment are automatically performed so as to match the given reference coordinate system of the metaverse space and suitable 6DoF. That is, this may correspond to a step in which, when alignment deviates from a ground baseline or when an element is in a wrong position, the pose value therefor is automatically adjusted.

According to another embodiment of the apparatus for generating a virtual concert environment in a metaverse, a road is set based on a plane using a map having spatial characteristics at the step of generating trees along a road in the virtual concert environment, in which case the plane is represented using only X and Y values and a Z value may be set to 0 or a fixed constant value. Also, when coordinate values on the ground surface are set for the category including the tree objects planted along the road, the binding box surrounding the tree object may match the coordinate system of the ground surface using these values. This process may automate generation of a space when each object is arranged in a space.

To this end, union, separator, scale, and the like using given model data have to be performed by referring to the relationship between objects or metadata on the objects in the virtual environment.

In conventional technology, these are performed only between solid models. That is, these are limitedly applied only in a uniform data structure. However, the embodiment may support a function such that union, separator, scale, and the like are performed between different types of model data.

The apparatus for generating a virtual concert environment in a metaverse according to an embodiment may be implemented in a computer system including a computer-readable recording medium.

Figure 8:
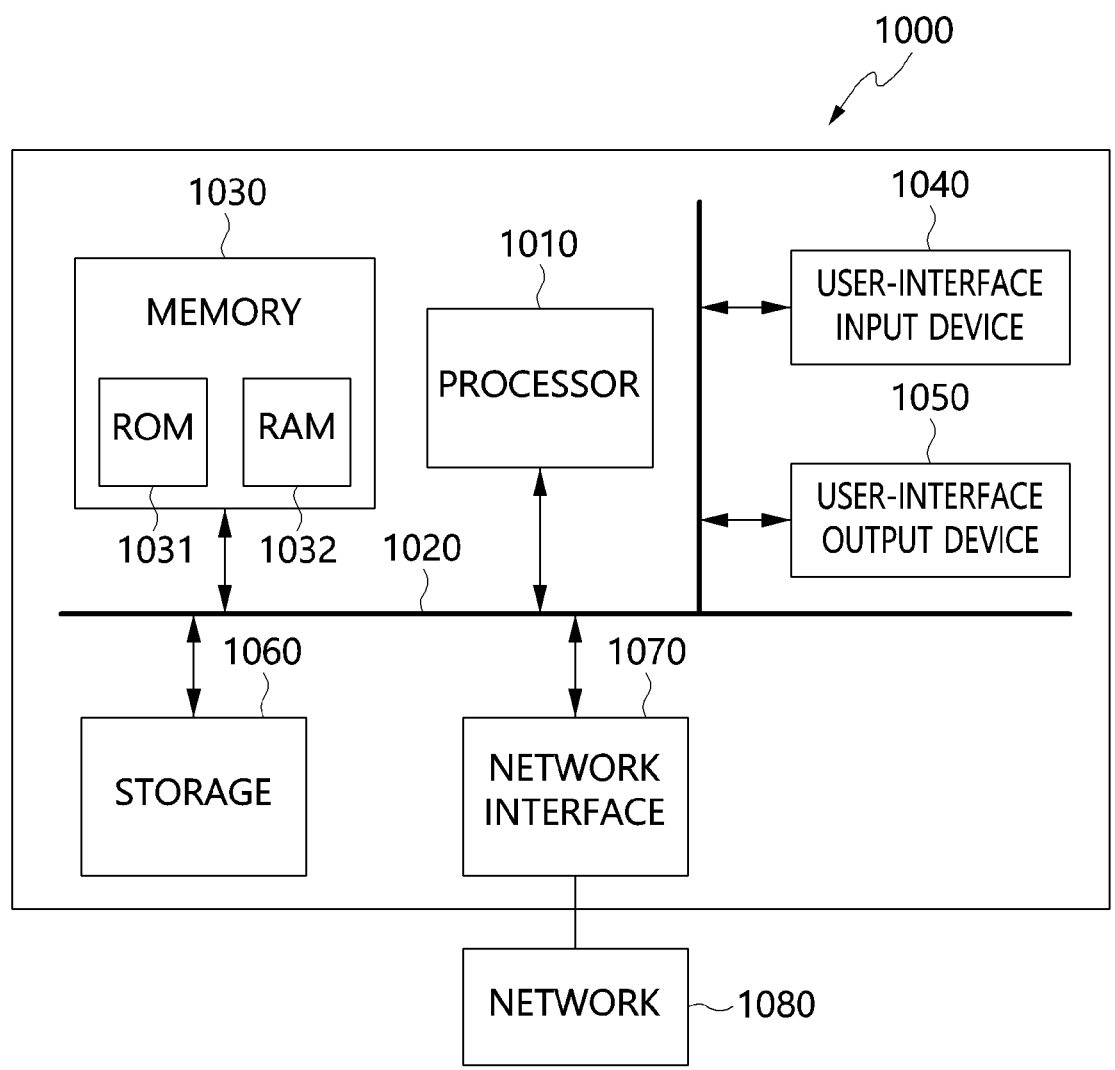
FIG. 8 is a block diagram illustrating the configuration of a computer system according to an embodiment.

FIG. 8 is a block diagram illustrating the configuration of a computer system according to an embodiment.

Referring to FIG. 8, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the apparatus for generating a virtual concert environment in a metaverse.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for generating a virtual concert environment in a metaverse according to an embodiment. Specifically, the memory may store multiple applications running in the apparatus for generating a virtual concert environment in a metaverse and data and instructions for operation of the apparatus for generating a virtual concert environment in a metaverse.

The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

An embodiment may intuitively change a virtual concert environment.

Also, according to an embodiment, various parameters may be set through deep-learning processing on already accumulated data, and because such metadata information on objects contain spatial characteristics, arrangement, and a correlation, processing time may be significantly reduced when applied in various application fields.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for generating a virtual concert environment in a metaverse, comprising:
   collecting data related to a virtual concert;
   generating a multi-feature layer map for reflecting features of respective elements constituting a virtual concert environment based on the data and generating a virtual concert environment based on the multi-feature layer map; and
   aligning and matching an object in the virtual concert environment based on virtual space coordinates of a metaverse space,
   wherein collecting the data related to the virtual concert includes
   transforming an object in a category to a parametric domain through a transform layer.

2. The method of claim 1, wherein collecting the data related to the virtual concert includes
   performing category processing by receiving the data as input of a deep-learning model.

3. The method of claim 2, wherein performing the category processing includes defining 6 degrees of freedom (6DoF) of the object in the category.

4. The method of claim 3, wherein performing the category processing further includes defining a correlation between categories.

5. The method of claim 4, wherein performing the category processing further includes defining a correlation between objects in the category.

6. The method of claim 1, wherein the multi-feature layer map is generated by gradually building a layer map based on similar features in a category domain generated based on the data and in a parametric domain into which an object domain in a category is transformed.

7. The method of claim 6, wherein the multi-feature layer map is configured to provide a user interface (UI) for representing the elements constituting the virtual concert environment as a 2D feature map.

8. The method of claim 7, wherein a result of the multi-feature layer map is capable of being reviewed in a 3D space.

9. The method of claim 1, wherein aligning and matching the object comprises automatically adjusting a pose value of the object when the object deviates from a ground baseline or when the object is in a wrong position.

10. The method of claim 1, wherein at least one of operations including union, separator, or scale, or a combination thereof is performed based on a relationship between objects in the virtual concert environment and metadata on the objects.

11. An apparatus for generating a virtual concert environment in a metaverse, comprising:
memory in which a control program for generating a virtual concert environment in a metaverse is stored; and
a processor for executing the control program stored in the memory,
wherein the processor collects data related to a virtual concert, generates a multi-feature layer map for reflecting features of respective elements constituting a virtual concert environment based on the data, generates a virtual concert environment based on the multi-feature layer map, and aligns and matches an object in the virtual concert environment based on virtual space coordinates of a metaverse space, and
wherein the processor performs category processing by transforming an object in a category to a parametric domain through a transform layer.

12. The apparatus of claim 11, wherein the processor performs category processing by receiving data as input of a deep-learning model.

13. The apparatus of claim 12, wherein the processor defines 6 degrees of freedom (6DoF) of the object in the category.

14. The apparatus of claim 13, wherein the processor defines a correlation between categories.

15. The apparatus of claim 14, wherein the processor defines a correlation between objects in the category.

16. The apparatus of claim 11, wherein the multi-feature layer map is generated by gradually building a layer map based on similar features in a category domain generated based on the data and in a parametric domain into which an object domain in a category is transformed.

17. The apparatus of claim 16, wherein the multi-feature layer map is configured to provide a user interface (UI) for representing the elements constituting the virtual concert environment as a 2D feature map.

18. The apparatus of claim 17, wherein a result of the multi-feature layer map is capable of being reviewed in a 3D space.

19. The apparatus of claim 11, wherein the processor automatically adjusts a pose value of the object when the object deviates from a ground baseline or when the object is in a wrong position.

20. The apparatus of claim 11, wherein the processor performs at least one of operations including union, separator, or scale, or a combination thereof based on a relationship between objects in the virtual concert environment and metadata on the objects.

* * * * *